March 17, 1959     R. J. ANREP     2,877,611
AUTOMATIC MACHINE FOR WASHING, FILLING AND SEALING
AMPOULES OR SIMILAR RECEPTACLES
Filed June 12, 1956     6 Sheets-Sheet 1
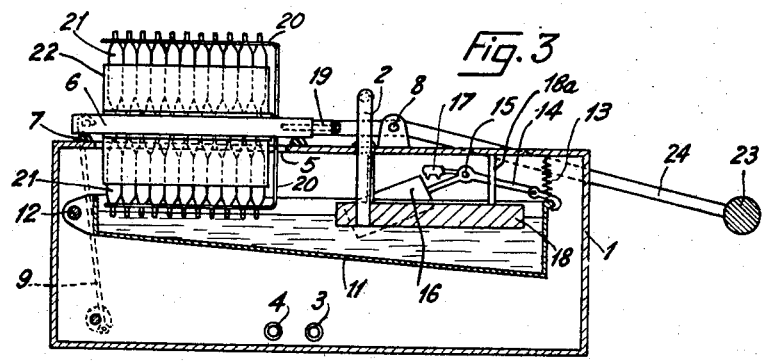
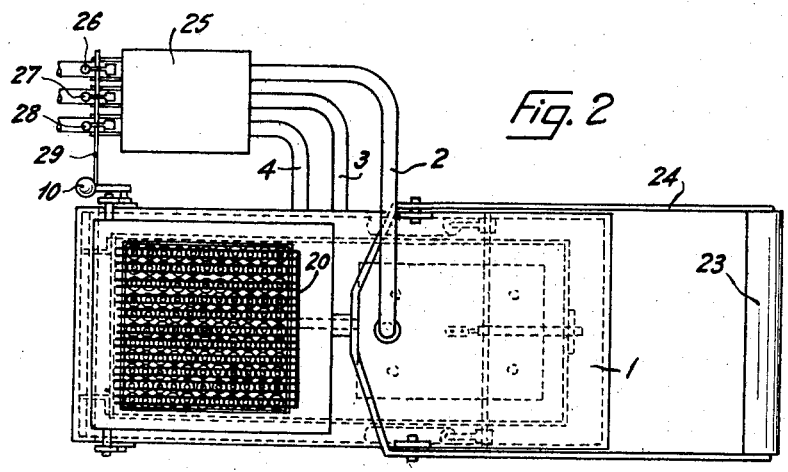
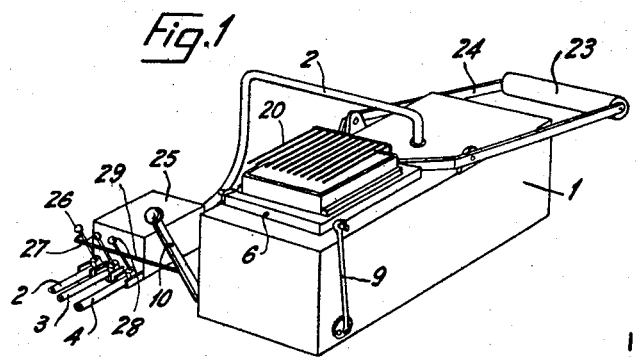
INVENTOR
RENÉ J. ANREP
By
Watson, Cole, Grindle & Watson
ATTORNEYS March 17, 1959
R. J. ANREP
2,877,611
AUTOMATIC MACHINE FOR WASHING, FILLING AND SEALING
AMPOULES OR SIMILAR RECEPTACLES
Filed June 12, 1956
6 Sheets-Sheet 2
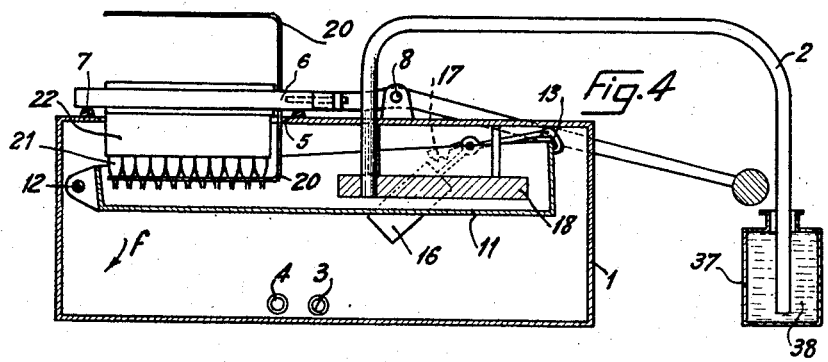
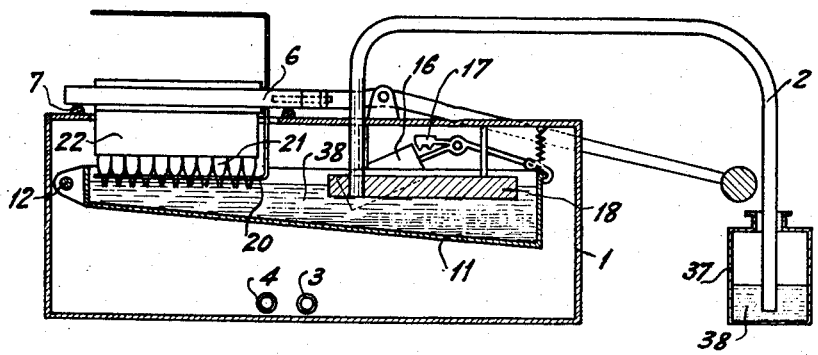
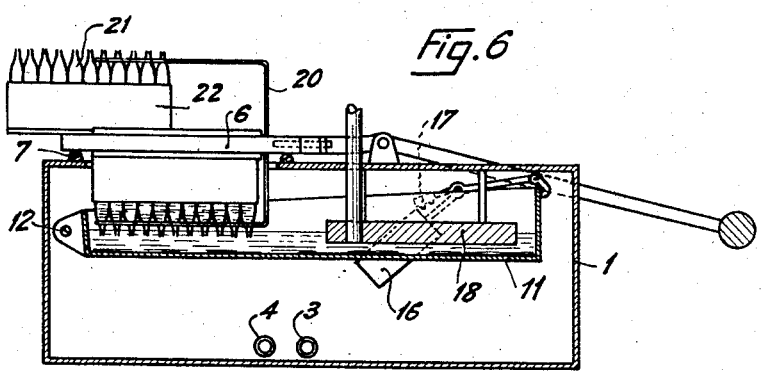
INVENTOR
RENÉ J. ANREP
By
Watson, Cole, Grindle & Watson
ATTORNEYS

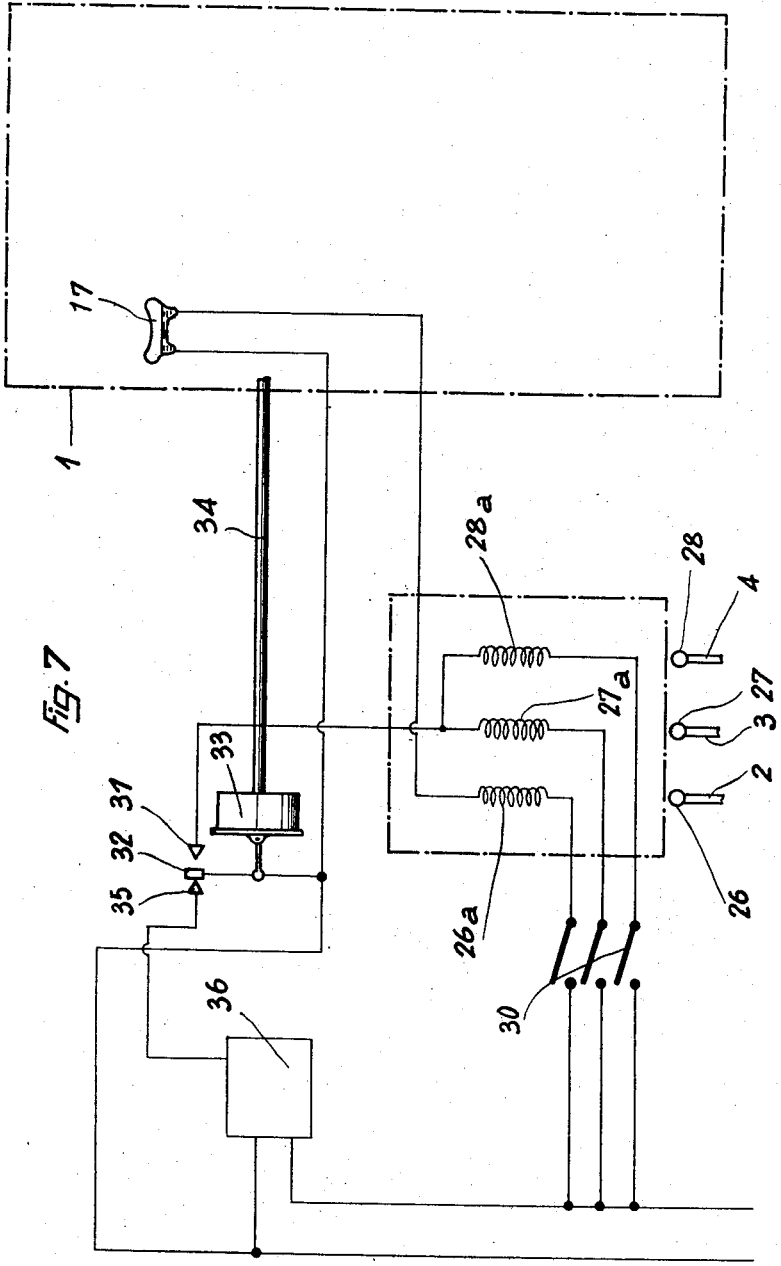

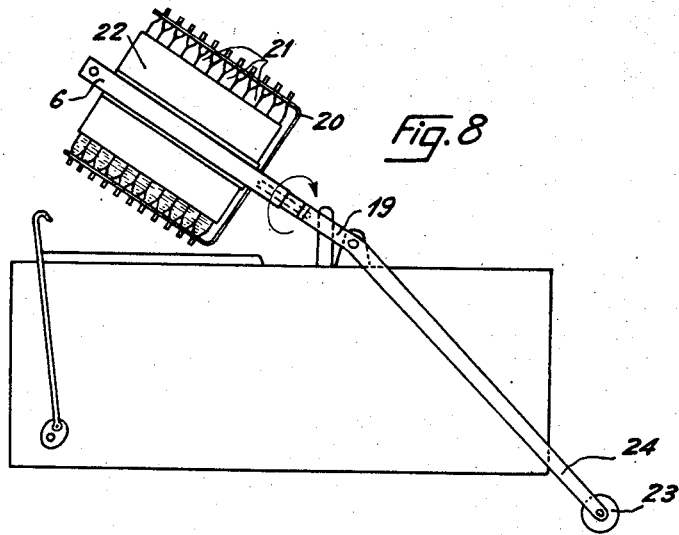
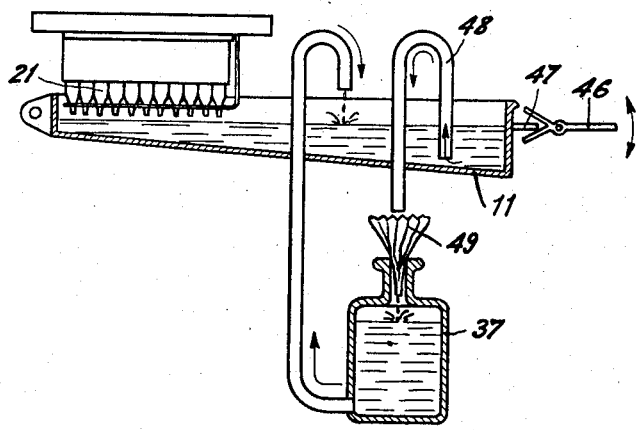
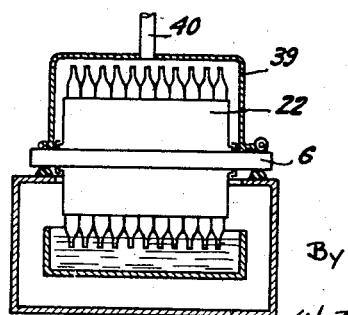

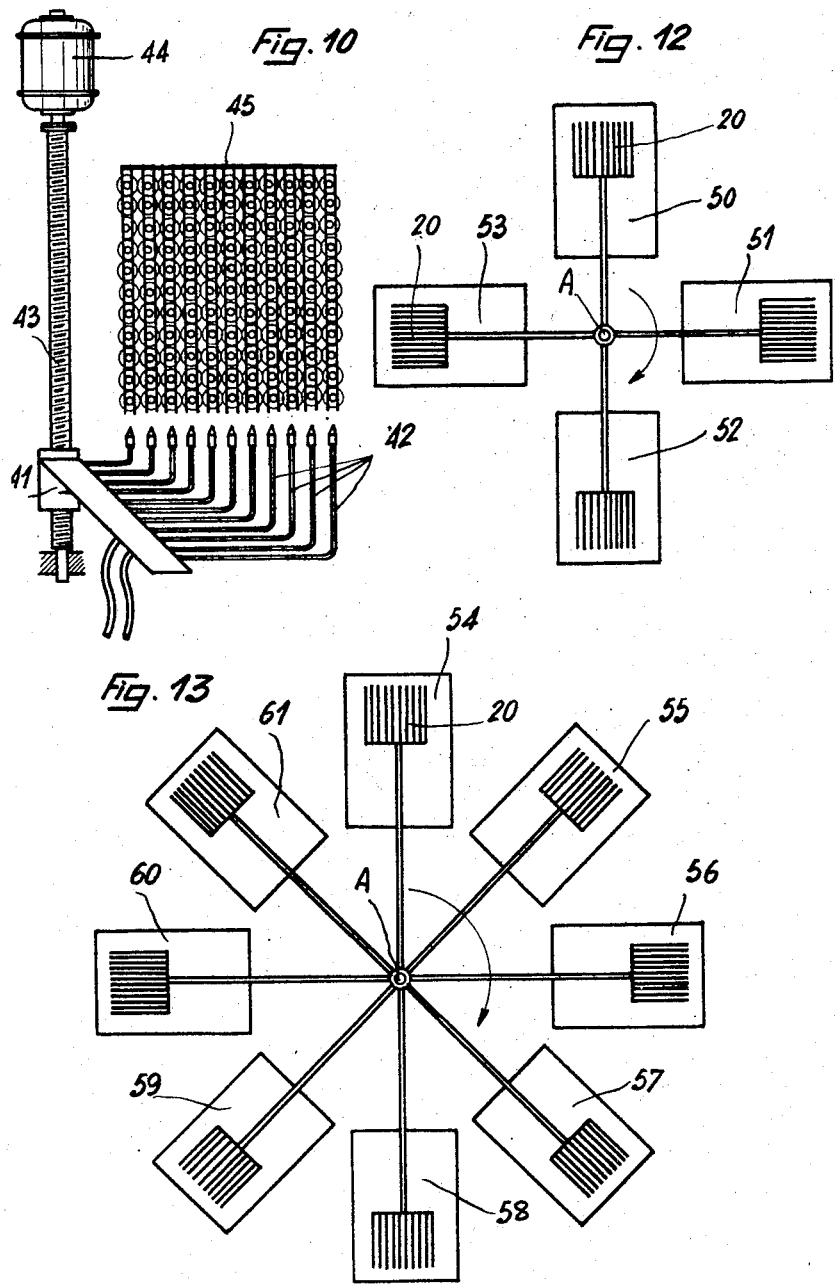

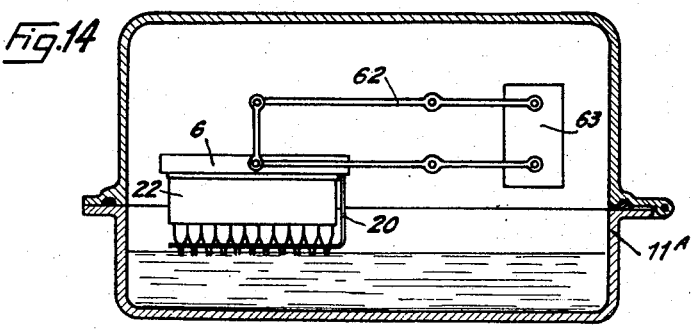
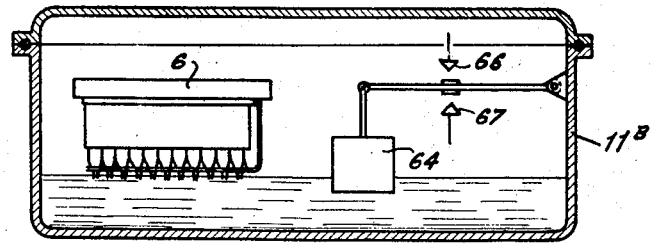
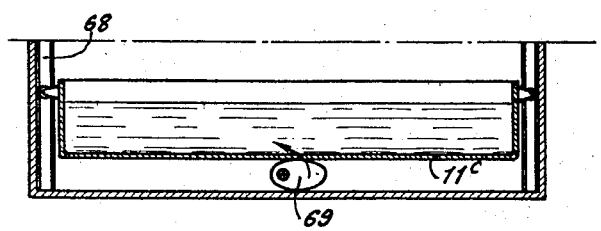
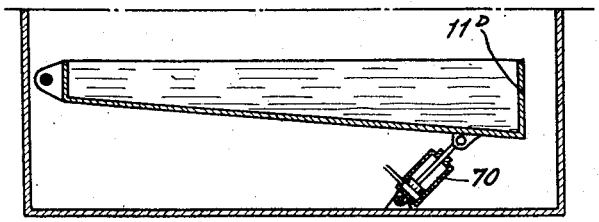

United States Patent Office 2,877,611
Patented Mar. 17, 1959

2,877,611

AUTOMATIC MACHINE FOR WASHING, FILLING AND SEALING AMPOULES OR SIMILAR RECEPTACLES

René J. Anrep, Suresnes, France

Application June 12, 1956, Serial No. 590,938

Claims priority, application France June 20, 1955

12 Claims. (Cl. 53—86)

At the present time, the filling of vessels of the drawn-out tube type such as ampoules for pharmaceutical products, is carried out by two principal methods, namely, filling by means of a needle and filling by the use of vacuum.

Filling with a needle has the drawback of being costly since, on the one hand, it necessitates the use of ampoules having relatively wide necks which are fairly expensive and, on the other hand, it requires complicated tooling equipment comprising mechanical moving parts, the adjustment of which is delicate. In addition, in view of the width of the neck, the sealing of the ampoule most frequently requires a heating operation with rotation of the ampoule and even the drawing-out of the neck. Thus, even with very modern tooling equipment, the rate of filling is slow.

The filling by means of a vacuum process is very rapid and economical. It is in fact only necessary to have available a vacuum bell under which is installed a small bowl containing the liquid, to plunge a series of ampoules into the said bowl, to create a vacuum which exhausts the air contained in the ampoules, and then to re-admit the air supply. Under the effect of the air pressure, the liquid rises inside the ampoules which are thus filled. In addition, ampoules with very fine necks can be employed, and the sealing of these may be effected by simple heating with a blow-pipe.

The drawback of this method of filling is its lack of cleanliness, since in order that the liquid may rise without fail inside the ampoule when the vacuum is removed, it is necessary that the said ampoule should be for its greater part immersed in the liquid with which it is to be filled. Under these conditions, the outside surface of the ampoule is to some extent washed by the liquid and the contaminations or impurities which may have accumulated on the said surface thus pass into the liquid and contaminate this latter.

This drawback assumes considerable importance, especially when the ampoules are intended to be filled with pharmaceutical or food products.

In addition, the machines for filling by vacuum of the known type require a number of manipulations which slow down their rate of output and again expose the ampoules to contamination.

The present invention has for its object a machine which operates in accordance with the principle of filling by means of vacuum and which enables ampoules or receptacles of a similar nature such as drop-counting flasks, etc., to be filled, washed and sealed under the best possible conditions of hygiene and with a minimum amount of operation.

The essential feature of this machine, which comprises essentially a chamber adapted to withstand a vacuum and a tank containing a filling or washing liquid, resides in the fact that means are provided for maintaining the level of the liquid at a substantially constant height with respect to the neck of the ampoule during all the operations in the course of which this neck has to be dipped into the liquid.

This relative constancy of the level of the liquid may be obtained either by keeping the level of the liquid in the tank substantially constant, the tank being fixed or movable, while the ampoule is in a fixed position, or by displacing the ampoule as a function of the fluctuation in level of the liquid.

The machine further comprises devices intended for controlling the intake of liquid and of air and the application of vacuum during the course of the various stages of filling or of washing, together with means which enable the manipulation to which the ampoule must be subjected during the operation to be simplified to the maximum extent.

The description which follows below with reference to the attached drawings (which are given by way of example only and not in any sense by way of limitation) will make it quite clear how the invention may be carried into effect, the special features which may be brought out, either in the drawings or in the text, being understood to form a part of the said invention.

Fig. 1 is a view in perspective of a machine constructed in accordance with the present invention.

Fig. 2 is a plan view to a larger scale of the same machine.

Fig. 3 is a cross-section taken along the line III—III of Fig. 2.

Figs. 4, 5 and 6 are diagrammatic views in cross-section similar to that of Fig. 3, illustrating various phases of operation of the machine.

Fig. 7 is a view to an enlarged scale showing the automatic control device of the machine.

Fig. 8 is a diagrammatic view showing the device for placing ampoules in position on the machine.

Fig. 9 is a view in cross-section, also diagrammatic, showing a device intended to eliminate the drop of liquid which may remain in the neck of the ampoule after filling.

Fig. 10 is a diagrammatic view in plan of a device for sealing the ampoules.

Fig. 11 is a diagrammatic view illustrating the application of the machine to the washing of the ampoule.

Figs. 12 and 13 are also very diagrammatic views of multi-station machines.

Figs. 14 to 17 are very diagrammatic cross-sections of alternative forms of construction of means intended to ensure the relative constancy of the level of the liquid with respect to the necks of the ampoules.

In the form of embodiment shown in Figs. 1 to 8, the machine essentially comprises a fluid-tight chamber 1 in which terminate the tubes 2, 3 and 4, which are respectively intended to put the said chamber into communication with a source of liquid, with a vacuum pump and with the atmosphere.

The chamber 1 is provided at its upper part with an opening 5 (see Fig. 3) which can be hermetically closed by a plate or tray 6 through the medium of a plastic joint 7, of rubber for example. The plate 6 is pivoted about an axis 8 and a locking mechanism 9 enables it to be held in place on the chamber 1. This locking mechanism is operated by a lever 10 (see Fig. 1).

The chamber 1 and the tray 6 are preferably made of transparent material, for example of "Plexiglas," this enabling a better control of the operation of the machine to be obtained.

Inside the chamber 1 a horizontal tank 11 is pivoted at one of its extremities about a spindle 12 and is suspended at its other extremity by springs 13. The bottom of the tank 11 is preferably slightly inclined downward from the pivoted extremity 12. Instead of the springs 13, the tank may be supported on a lever 14 pivoted on a shaft 15 and weighted by means of a counter-weight 16; the two forms of support (springs and lever with counter-weight) may also be combined as shown in Fig. 3.

With the tank 11 is associated a contact 17, for example of the mercury type, the action of which will be explained later. In the present example, this contact is carried by a member which moves with the tank and which is the device 14–16 comprising a lever and counter-weight.

Above the tank 11 is provided a plunger 18 having a large surface and of considerable thickness, this member being held in a fixed position by means of the small pillars 18a which support it from the top of the chamber 1. In the example shown, the plunger 18 has passing through it the pipe 2 which brings in the liquid supply.

The plate 6 is mounted on its pivotal support 8 by means of an arm 19, with respect to which it may pivot axially, as shown in Fig. 8. On each of its faces, the plate 6 is provided with a grid 20 fitted with longitudinal parallel rods, the spacing between which and also their distance from the plate will depend on the size of the ampoules to be treated. The ampoules 21 are placed on the machine stacked in a small box 22, this box being inserted, as particularly shown in Figs. 2, 3 and 8, between the rods of the grid 20, in such manner that the ampoules are held in position when the plate 6 is completely inverted. In order to facilitate its handling, the plate is associated with a counter-weight 23 carried by lateral arms 24.

The piping systems 2, 3 and 4 which leave the chamber 1, pass through a control casing 25 (see Figs. 1 and 2) in which is provided on each of the conduits a valve 26—27 and 28 with automatic control, which can preferably be of the type described in my French patent application No. 693,362, filed June 8, 1955, for "Shut-Off Valve."

With these valves is associated a setting bar 29 which is preferably operated by the lever 10. The valves are arranged in such manner that the valve 26, which controls the incoming supply of liquid, is open in the set position, as is also the valve 27 which controls the communication with the vacuum pump, whilst the valve 28 which controls the supply of air is closed in the set position.

With each of these valves is associated an electro-magnet 26a, 27a or 28a (see Fig. 7) which actuates the release. These electro-magnets are connected to the electric supply network through the medium of a contactor 30, which is also preferably operated by the lever 10. The electro-magnet 26a is coupled to the second wire of the electric supply through the medium of the mercury switch 17 associated with the tank, this switch being arranged so as to establish the connection only when the tank has turned downwards through a certain angle about its axis 12.

The electro-magnets 27a and 28a are both connected to a contact 31 which cooperates with a contact 32 displaced by a pressure gauge 33 connected to the chamber 1 through a pipe 34. Normally the contact 32 is supported on a contact 35 which controls the opening of the circuit breaker 36 of the vacuum pump. As soon as the vacuum inside the chamber 1 has reached a predetermined value, the pressure gauge 33 moves the contact 32 which cuts-off the supply of current to the vacuum pump and puts the electro-magnets 27a and 28a under tension, thus releasing the valves 27 and 28. The valve 27 closes whilst the valve 28 opens and permits the air to pass into the chamber 1.

The operation of the machine, as disclosed in Figures 4–6, as applied to the filling of ampoules is as follows.

In the manner described with reference to Fig. 8, a small container 22 is placed on the plate 6 between the bars of the grid 20, the plate is then turned over and it is applied to the opening 5. The plate is then locked in position by means of the lever 10, which also closes the switch 30 and simultaneously sets the valves 26, 27 and 28. The pipe 2 is put into communication with the source of liquid 37, whilst the pipe 3 is put into connection with the vacuum pump and the pipe 4 is closed.

The circuit breaker of the vacuum pump being closed (which operation may also be carried out by means of the lever 10), the air begins to be withdrawn from the chamber 1. Under the effect of the reduction in pressure thus produced, the liquid 38, forced out by the atmospheric pressure in the vessel 37, falls into the tank 11. This tank becomes heavier and begins to pivot towards the base in the direction of the arrow $f$, against the force of the springs 13 and of the counter-weight 16. When the liquid has reached a certain height, the liquid comes in contact with the plunger 18 which, by virtue of the principle of Archimedes, applies to the tank a reaction directed downwards and equal to the weight of the volume of liquid displaced, this reaction helping to ensure the constancy of adjustment of the level.

Thus, the purpose of the plunger 18 is to provide for an acceleration of the motion of the tank as it reaches a position corresponding to the predetermined position stated above.

As soon as the level of liquid in the tank 11 has attained a sufficient value, the plunger 18 becomes immersed and submitted to the Archimedean thrust which is equal or proportional—according to the system employed—to the displaced volume of liquid. The thrust increases as the tank fills with liquid. The plunger being stationary, the thrust results in a downwardly directed reaction on the tank, which adds to the weight of the tank and water and acts together with the said weight against the opposing or counter-balancing device (springs 13 and counter-weight 16) of the tank for accelerating the motion of said tank as it approaches the predetermined position for which the supply of liquid is cut off.

This lowering of the tank is compensated by a raising of the level of liquid due to the displacement of liquid by the plunger; when the tank is emptied, the volume of liquid displaced by the plunger diminishes together with the Archimedean thrust and the counter-balancing device is more quickly relieved, the decrease of level due to the sinking down of the tank being compensated by the decrease of the displaced volume of liquid.

A greater quantity of liquid may be introduced into or taken from the tank for a smaller variation of the liquid level.

The contact 17 is adjusted in such manner that the contact is made when the tank has reached, under the influence of the weight of the liquid, a predetermined inclination, and in which position the drawn-out necks of the ampoules 21 dip into the liquid 38. When the contact is made, the valve 26 is released and cuts-off the supply of liquid. The contact of the pressure gauge 31–35 is adjusted in such manner that it only releases after the contact 17 has operated.

When a sufficient degree of vacuum has been obtained, the contact of the pressure gauge cuts-off the supply to the vacuum pump and closes the excitation circuit of the electro-magnets 27a and 28a of the valves 27 and 28, which are released. Air then passes into the chamber 1 through the piping system 4 and the ampoules 21 are filled, due to the effect of the atmospheric pressure. By reason of this filling action, the quantity of liquid contained in the tank is reduced, the tank becomes lighter and slowly rises as the liquid is drawn into the ampoules under the action of the springs 13 and/or of the counter-weight device 16. The contact 32 is simultaneously brought back on to the contact 35.

During all these operations, the operator responsible for the supervision of the machine has had the time to place a second small container 22 of ampoules 21 on the plate 6. When the filling of the ampoules in the first container has been completed, it is only necessary, after having freed the plate 6, to again turn it face downwards and to lock it again in position, this operation effecting the setting of the valves and the closure of the necessary contacts. The cycle of operation can then be repeated.

The method of operation which has just been described above is capable of a number of variations. Thus, for example, in the case of frothy liquids, the intake of liquid can be regulated in such manner that it does not take place until the vacuum has been established in order to prevent the air passing out of the ampoules bubbling through the liquid and thus causing the formation of froth.

As shown in Fig. 9, a pneumatic bell 39 provided with a pipe 40 which enables either a vacuum to be created or air under pressure to be applied to the bell, may be placed on the upper face of the plate 6 before the container 22 of filled ampoules is removed. This bell enables the drop of liquid to be eliminated which may adhere by capillary action to the extremity of the neck of the ampoule.

The machine may also comprise a device for sealing in series the necks of the ampoules. As shown in Fig. 10, this device is preferably constituted by a trolley 41 carrying a series of blow-pipes 42 with parallel nozzles. This trolley is moved by means of a threaded spindle 43 which is rotated by a motor 44. Under the path of the nozzles of the blow-pipes is provided a grid device 45, similar to that of the plate 6, and intended to keep the necks of the ampoules in line.

The machine which is the object of the invention may also be adapted to the washing of ampoules, as in Figure 11. To this end, it is provided, in addition to the members already described, with a fork-shaped lever 46 or similar control member which co-operates with a projection 47 formed on the tank 12 and enables the latter to be rocked at will, and with a drainage siphon 48 which may for example terminate in a filter 49, supplying the liquid reservoir 37. This siphon is controlled by a fourth valve which may be of the same type as those previously described, and which is closed in the set position.

The operation of a machine thus equipped is as follows:
The ampoules 21 to be washed, having been placed in position, as in the case of a filling operation, the machine is then started-up, the valve for the washing liquid and the vacuum control valve being open while the drainage valve and the air valve are closed. Under the effect of the vacuum, the air is exhausted from the ampoules and the tank fills up. When the tank has rotated through a certain angle, the contact 17 releases the washing liquid valve 26 which closes and then, when a sufficient degree of vacuum has been obtained, the pressure gauge 33 releases the valves 27—28. Air then passes into the apparatus and forces the liquid into the ampoules.

The vacuum and air valves are then re-set cutting-off the supply of air and re-establishing the connection with the vacuum pump. Under the effect of the depression which is thus produced, the ampoules are emptied. At this stage of the operation, the tank is held in its lower position by means of the lever 46, so that the necks of the ampoules do not dip into the liquid. When a sufficient degree of vacuum has been obtained, the pressure gauge again releases the vacuum and air valves, and the chamber is again filled with air. As soon as the chamber has filled with air, the lever 46 can be released. At this moment, it is only necessary to open the drainage valve in order to enable the siphon 48 to evacuate the used liquid.

Figs. 12 and 13 show how the present machine may be adapted to multiple operations in a continuous cycle. To this end, for example as shown in Fig. 12, four machines 50, 51, 52 and 53 are arranged at 90° from each other and, above these machines, four plates are mounted such as the plate 6, each being provided with grids 20, the plates being arranged so as to be able to rotate about a vertical axis A. The machine 50 may for example be used for filling the ampoules with a washing liquid, whilst the machine 51 ensures the emptying of the ampoules, the machine 52 effects their rinsing or filling by means of a second liquid and the machine 53 again empties them. By causing the plates to be turned over after each operation, the desired treatments can be applied in succession to the ampoules, or again, as shown in Fig. 13, a certain number of machines and operating stations may be combined. In Fig. 13, eight stations and machines are arranged on a circle and are associated with eight plates with grids, mounted as previously described.

In the example shown, the cycle comprises:
A station 54 at which the plates are loaded;
A machine 55 in which the ampoules are filled with a washing or cleaning solution;
A machine 56 in which the emptying of the ampoules is effected;
A machine 57 in which the ampoules are filled with rinsing water;
A machine 58 in which the ampoules are again emptied;
A station 59 at which the drying and the sterilisation of the ampoules are carried out;
A machine 60 in which the ampoules are filled with the liquid which they are to contain, and
A station 61 at which the removal of the drop is effected by means of a bell such as that shown at 39 (see Fig. 9).

The loading station 54 may also serve as a sealing station, preferably by means of the device shown in Fig. 10. Other stations could of course be provided for example a station for checking the fluid-tightness of the ampoule, etc.

Figs. 14 to 17 show very diagrammatically other alternative arrangements which could be used, in combination with the devices already described, in order to ensure the relative constancy of level of the liquid with respect to the ampoule.

In Fig. 14, the tank 11A is fixed whilst the plate 6 which carries the container 22 with its ampoules is movable and is mounted for example on an articulated parallelogram 62 provided with a counter-weight 63. As the liquid rises inside the ampoules, the level falls in the tank 11A, but in view of the fact that the weight carried by the plate 6 increases, this plate moves down and thus compensates for the fall in the level.

In Fig. 15, the tank 11B and the plate 6 are fixed, but the tank is provided with a float-contact 64 associated with contacts 66 and 67, the contact 66 closing the incoming supply of liquid whilst the contact 67 opens this supply. In this way, a sufficient constancy of the level of liquid can be maintained.

In Fig. 16, the tank 11C is guided in vertical slides 68 in order that it may move parallel to itself. This movement is effected by means of a cam 69, the profile and the motion of which are determined in such manner as to ensure the necessary constancy of level.

In Fig. 17, the tank 11D is controlled, again with the same object, by a pneumatic or hydraulic device 70. These two last methods of control may of course act on the plate which carries the ampoule container instead of acting on the tank.

The following example will clearly show the advantages obtained from the machine which forms the object of the invention.

If for example in a filling machine of the vacuum type of known construction, an ampoule of 10 cu. cm. and 16 mm. in diameter is immersed to a depth of 40 mm. in the liquid, the surface in contact with the liquid is of the order of 25 sq. cm.

With the present invention, assuming a fluctuation in the level of liquid of the order of 1 cm., which furthermore is excessive, and with a mean diameter of neck of 2 mm., the surface in contact is of the order of 0.6 sq. cm. or 40 times smaller.

If it is remembered that more than half of the contaminations occurring in full ampoules are due to the contact of the surface of the ampoule with the liquid, the advantage obtained can be clearly appreciated, especially in the case of pharmaceutical and food products.

The output of the machine may attain several thousands, or even several tens of thousands of ampoules per hour, depending on the capacity of the ampoules.

The machine may further be provided with any kind of alarm or safety device, for example in the case of a stoppage in the supply of liquid, of failure to operate of the valves, etc.

It will of course be understood that modifications may be made to the machines which have been described above, especially by the substitution of equivalent technical means, without thereby departing from the spirit or from the scope of the present invention.

What I claim is:

1. A machine for filling or washing ampoules or like receptacles having a neck, by means of a vacuum system, comprising in combination: a chamber adapted to withstand a vacuum, a tank disposed within said chamber, means for feeding a liquid to said tank and for discharging said liquid therefrom, means for supporting said receptacles above said tank within said chamber with the necks only of said receptacles dipping into said liquid, and means for maintaining the level of the liquid in said tank at a substantially constant height with respect to the necks of said receptacles in all operations during which the said necks are required to dip into the liquid.

2. A machine in accordance with claim 1 wherein said tank is pivotally mounted at one of its extremities, about an horizontal axis within said chamber, and there is provided a counterbalancing means yieldingly opposing the downward pivoting of the tank under the influence of the weight of liquid contained therein.

3. A machine in accordance with claim 2, wherein the bottom of the said tank is inclined downwards from the pivotal axis of the said tank.

4. A machine for filling or washing ampoules or like receptacles having a neck, by means of a vacuum system, comprising, in combination: a chamber adapted to withstand a vacuum and a tank disposed within said chamber and adapted to receive a suitable liquid, means for maintaining the level of the liquid in the said tank at a substantially constant height with respect to the neck of receptacles, in all the operations during which the said neck is required to dip into the liquid, a counter-balancing means yieldingly opposing the downward pivoting of the tank under the influence of the weight of liquid contained therein; and a plunger body having a relatively large volume provided above said tank, the said body being adapted to superimpose on the weight of the said tank and its contents the effort due to the Archimedean thrust as soon as the liquid has reached the level of the said plunger and the plunger begins to be immersed therein.

5. A machine for filling or washing ampoules or the like receptacles having a neck, by means of a vacuum system, comprising, in combination: a chamber adapted to withstand a vacuum and a tank disposed within said chamber and adapted to receive a suitable liquid, means for maintaining the level of the liquid in the said tank at a substantially constant height with respect to the neck of receptacles, in all the operations during which the said neck is required to dip into the liquid, the chamber being provided, above a portion of said tank, with an opening; a receptacle-supporting plate adapted to be brought into position to close said opening, hermetic sealing means between said plate and the margins of said opening, means on both faces of said plate for holding a number of such receptacles, means adjustable to support said plate for inversion and application to said opening in upside down position, whereby a supported group of receptacles carried on either face of said plate may be passed through said opening and the necks only of said receptacles immersed in said liquid.

6. A machine in accordance with claim 5, wherein said plate supporting means including means mounting said plate to turn about an axis directed along one of its centre lines, the said axis being in addition articulated on the said chamber about an axis at right angles thereto, and a counter-weight operatively supported on the opposite side of said latter axis to facilitate the raising of the plate.

7. The machine as set forth in claim 5 in which there is provided in marginal hermetic sealed relation a bell which covers the upwardly directed face of said plate which carries a group of receptacles which have been filled, and means for applying a pneumatic pressure differential within said bell for moving any remaining drops of liquid left in the necks of the receptacles after the filling operation.

8. In combination with the receptacle filling device set forth in claim 5, a supplemental support adapted to receive filled receptacles from said filling device, said support comprising a grid open at one of its extremities and of a height corresponding to the receptacle carrying means of the filling device, so as to receive rectilinear rows of receptacles, a series of blow pipes disposed above said grid and each having a nozzle positioned in line with one of said rows, a carriage supporting said blow pipes, and means for moving said carriage along said rows of receptacles carried by the grid so as to seal said receptacles.

9. A machine for filling or washing ampoules or like receptacles each having a neck, by means of a vacuum system, comprising, in combination: a chamber adapted to withstand a vacuum and a tank disposed within said chamber and adapted to receive a suitable liquid; a plate-like member adapted to be moved to a position for supporting a plurality of receptacles with their necks downward within said chamber and above said tank, means for locking said member in said position; means for maintaining the level of the liquid in said tank at a substantially constant height with respect to the necks of the receptacles in all the operations during which the necks only are required to dip into the liquid; a liquid supply conduit, an air supply conduit, and a conduit connected to a vacuum pump, all of said conduits terminating in said chamber; valves in said conduits, the valve in the liquid conduit and the valve in the vacuum conduit being normally closed and the valve in the air conduit being normally open; automatic actuating means for said valves operating when energized to open the liquid and vacuum valves and close the air conduit; and common mechanism for actuating said valves and simultaneously actuating the receptacle supporting member locking means.

10. A machine for filling or washing ampoules or like receptacles each having a neck, by means of a vacuum system comprising, in combination, a chamber adapted to withstand a vacuum and a tank disposed within said chamber and adapted to receive a suitable liquid; means for supporting a number of said receptacles within the chamber and above the tank with their necks downwardly disposed; means for maintaining the level of the liquid in said tank at a substantially constant height with respect to the necks of the receptacles in all the operations during which said necks are required to dip into the liquid; a liquid supply conduit, an air supply conduit, and a conduit connected to a vacuum pump, all of said conduits terminating in said chamber; valves in said conduits, the valve in the liquid conduit and vacuum conduit being closed and the valve in the air conduit being open when the machine is idle; means for actuating the valves when the operation is initiated to open the liquid conduit valve and the vacuum conduit valve and close the air conduit valve, means supporting said tank for displacement in a vertical direction as the tank is receiving liquid; and a contactor automatically actuated by displacement of said tank for operating the valve in the liquid conduit to cut off flow of liquid to the tank.

11. The machine as set forth in claim 10 in which a manometric switch is provided for actuating the valves in the air and vacuum conduits upon the attainment of the required degree of vacuum, whereupon the vacuum valve is closed and the air valve opened; the previously evacuated receptacles thus being filled with liquid through the effect of the atmospheric pressure introduced.

12. A machine intended for filling or washing ampoules or the like receptacles having a neck, by means of a vacuum system, comprising, in combination: a chamber adapted to withstand a vacuum and a tank to receive a suitable liquid, means for maintaining the level of the liquid in the said tank at a substantially constant height with respect to the neck of receptacles, in all the operations during which the said neck is required to dip into the liquid, a liquid supply conduit, an air supply conduit and a conduit connected to a vacuum pump, all terminating in the said chamber, the said conduits for liquid, air and vacuum being provided with valves having automatic release, the liquid conduit and the vacuum conduit being open whilst the air conduit is closed when the corresponding valve is actuated, the valves of the air and vacuum conduits being actuated by a manometric contactor, and means operatively associated with and actuated by the said manometric contactor for simultaneously controlling the closure of the source of vacuum.

References Cited in the file of this patent

UNITED STATES PATENTS

| | | |
|---|---|---|
| 668,303 | Beyer | Feb. 19, 1901 |
| 1,862,821 | Henderson | June 14, 1932 |
| 1,925,502 | Schaeffer | Sept. 5, 1933 |
| 2,679,343 | Smith et al. | May 25, 1954 |